ELECTROSTATIC TUNING FORK RESONATOR

Filed Nov. 13, 1962

INVENTOR
ROBERT R. SHREVE
BY Darby & Darby
ATTORNEYS

United States Patent Office 3,350,667
Patented Oct. 31, 1967

3,350,667

ELECTROSTATIC TUNING FORK RESONATOR

Robert R. Shreve, Massapequa, N.Y., assignor to Philamon Laboratories, Inc., Westbury, N.Y., a corporation of New York Filed Nov. 13, 1962, Ser. No. 237,121
2 Claims. (Cl. 333—71)

The present invention relates to tuning fork resonators for use as audio frequency filters, oscillators, etc., in which the driving forces for the tuning fork are obtained electrostatically.

Tuning fork resonators are known and frequently used as a frequency stable source of electrical signals or as an audio frequency filter, particularly in the ranges of hundreds and thousands of cycles per second. While such tuning forks have met with substantial success in certain applications, there is a constant source of difficulty created by a tendency for the electrical power supplied for driving the tuning fork to couple into the output of the tuning fork resonator other than by the medium of the tuning fork resonance.

For example, it is common to drive tuning forks magnetically and to utilize a magnetic pickup. Since both drive coils and pickup coils must be placed in proximity to the tuning fork, there is a strong tendency toward magnetic coupling between drive coil and pickup coil. This effect is particularly serious in instances where it is desired to utilize the tuning fork as a sharp audio-frequency filter. A tuning fork resonator has particularly good characteristics for use as a filter since it is a very high "Q" device. Naturally, any leakage coupling directly from the drive coil to the pickup coil in such an arrangement substantially reduces the degree of frequency discrimination of the device.

According to the present invention, drive-pickup coupling can be substantially eliminated, for example, by utilizing an electrostatic drive and an electromagnetic pickup between which there is virtually no undesired direct coupling.

Another advantage of the electrostatic drive tuning fork resonator of the present invention resides in the fact that magnetic characteristics no longer affect the driving mechanism. This means tuning fork materials can now be utilized which have magnetic characteristics or variations of magnetic characteristics with temperature which would be undesirable in a magnetically driven fork.

Furthermore, temperature limitations due to the effect of temperature on magnetic characteristics are relaxed. If desired, a pickup other than magnetic may be utilized, for example photoelectric pickup, in which case all dependence on magnetic properties would be eliminated.

In addition to providing the foregoing features and advantages it is the object of the present invention to provide an electrostatically driven tuning fork resonator which can be utilized with a magnetic pickup with greatly reduced intercoupling between the drive and pickup elements as compared with an electromagnetically driven and electromagnetically detected tuning fork resonator.

It is another object of the present invention to provide an electrostatic drive for a tuning fork which is substantially free from dependence upon magnetic properties of the tuning fork and the change of these properties with temperature.

It is still another object of the present invention to provide electrostatically driven tuning fork resonators wherein a series of such resonators may simply and conveniently be driven from a single electrostatic driving electrode, thus providing a multiple resonant tuning fork resonator device, useful, for example, as a band-pass-filter.

It is a still further object of the present invention to provide an electrostatically driven tuning fork resonator which is readily adapted to be driven by common transistor circuit voltage magnitudes such as 6 volts and in which a bias for the tuning fork resonator is provided by the input signal and is thereby varied in magnitude in accordance with the magnitude of the input signal.

Other objects and advantages will be apparent from a consideration of the following description in conjunction with the appended drawing in which.

Figure 1:
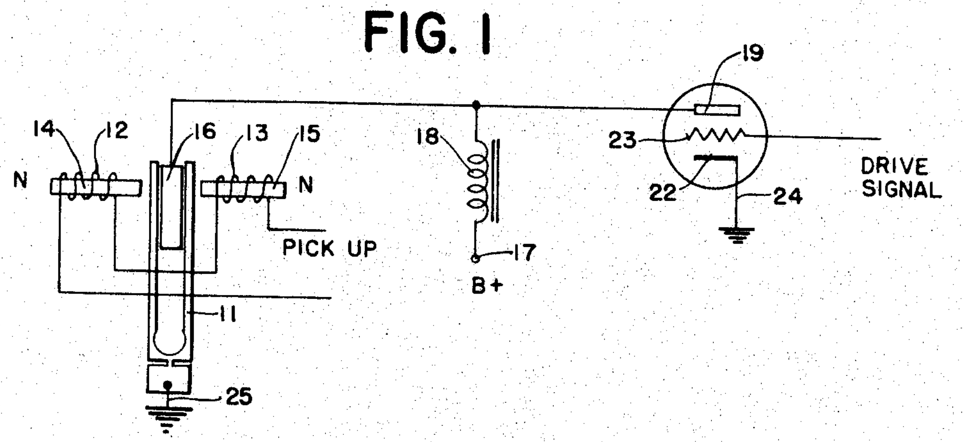
FIGURE 1 is a schematic diagram of a simple electrostatically driven tuning fork resonator according to the present invention.

Referring now to FIGURE 1, tuning fork 11 may be of conventional design or as shown in my U.S. Patent No. 2,806,400 for "Tuning Forks," filed Mar. 10, 1954.

As is well known, tuning fork 11 has a particular resonant frequency which may, in a typical case, be 1,000 cycles per second.

A pair of coils 12 and 13 connected in series are provided to detect or pick up mechanical vibrations of tuning fork 11 and convert them into an electrical signal.

Coils 12 and 13 are wound respectively on cores 14 and 15 which may be magnetized to provide a bias magnetic field and hence increase the sensitivity of pickup coils 12 and 13. If desired, the static force due to magnetic attraction may be determined to equal and balance the force due to the electrostatic bias voltage thus eliminating static imbalance of forces on the fork tines. The magnetic pickup arrangement of FIGURE 1 is merely exemplary, and any other means of converting the mechanical vibration of tuning fork 11 into an electrical signal may be utilized. A fine beam of light may be projected on the end of the tuning fork tine and reflected to a photo-sensitive device so that movement of the tine will cause corresponding changes in the amount of light reflected and hence in the electrical output of the photoelectric device. It will, in some cases, be desirable to use a non-magnetic pickup as well as the electrostatic drive device in order that all dependence upon magnetic characteristics of the tuning fork may be eliminated. In such a case, the selection of tuning fork material may be made to optimize stability of tuning fork frequency with changes in temperature and other desirable physical characteristics. A conductor electrode 16 is placed between the fork tines which in simplest form may comprise a rigidly supported plate of conductive material, for example silver-plated copper. The electrode 16 is connected to receive the output of electron tube 21 from plate 19 of electron tube 21. The drive signal is provided to grid 23 of electron tube 21. Tube 21 is also provided with a conventional cathode 22. The electron tube circuit including tube 21 is merely exemplary and may be modified or replaced by any amplifier circuit of conventional design.

Plate 19 is connected to the B+ power terminal 17 through an inductance 18 and the plate-cathode circuit for tube 21 is completed by ground terminal 24 connected to cathode 22.

It will be noted that the B+ power supply for tube 21 also provides a bias for electrode 16 so that electrode 16 never changes polarity with respect to tuning fork 11 which is grounded through lead 25. This is desirable in view of the fact that if electrode 16 changes polarity, that is, if it had zero bias or insufficient bias, then fork 11 would be driven at twice the frequency of drive signals applied to the tube 21. This would result because the tuning fork 11 will respond to the absolute value of the voltage applied between the tines and the electrode 16, and without bias applied to electrode 61, the tuning fork 11 would be subjected to similarly directed forces twice during each cycle of drive signal applied to plate 21. Accordingly, a tuning fork having a resonant frequency of 1,000 cycles would respond to a drive signal of 500 cycles in the absence of bias. Since this is generally, but not always, undesirable, it is generally desired to provide a bias signal to electrode 16 exceeding the maximum input signal so that the tuning fork will respond to an electrical input signal having a one-to-one relationship with the tuning fork resonant frequency.

The electrostatic drive mechanism is notably free of dependence upon characteristics of materials, particularly as compared with the electromagnetic drive elements of the prior art. Electrical resistance of the elements of the electrostatic drive will be low and hence of virtually no consequence in determining the driving force. Even if the tuning fork 11 is made of a non-conductive material, a thin conductive layer of silver or other suitable material may be deposited opposite electrode 16 and electrically connected in a suitable manner to ground lead 25 secured to a stationary part of the tuning fork. The dielectric in the electrostatically driven tuning fork corresponds to the magnetic material in the electromagnetically driven tuning fork. However, since the dielectric is either a gas or a vacuum, preferably the latter, its dielectric properties are practically invariable over substantial temperature ranges.

A particular advantage accrues from the apparatus of FIGURE 1 in that there is negligible electrical coupling between drive electrodes 16 and pick-up coils 12 and 13. This is a consequence of using electrostatic fields for driving the tuning fork and using electromagnetic flux variations for detecting the fork vibration. Even if there were adverse effects from the electrostatic field of the drive element, it is possible to virtually completely shield electrostatic fields and eliminate their influence on nearby elements. On the other hand, shielding with respect to magnetic fields is difficult and is impractical to carry out.

Contrary to what might be expected, excessive voltages are not required for the electrostatic drive of FIGURE 1, nor is the spacing between electrode 16 and the fork 11 required to be inconveniently close. For example, a drive voltage of 300 volts peak-to-peak is more than adequate to drive a tuning fork with an electrode area of one square centimeter and a spacing of 0.5 millimeter.

The apparatus of FIGURE 1 is simple and well adapted for use where the high voltage, low current output of electron tubes is available to drive the tuning fork. It will be desirable, in many cases to drive the tuning fork from a transistor or other solid state circuit in which low voltages are employed. The alternative arrangement of FIGURE 2 is particularly adapted for use with transistor circuits.

Figure 2:
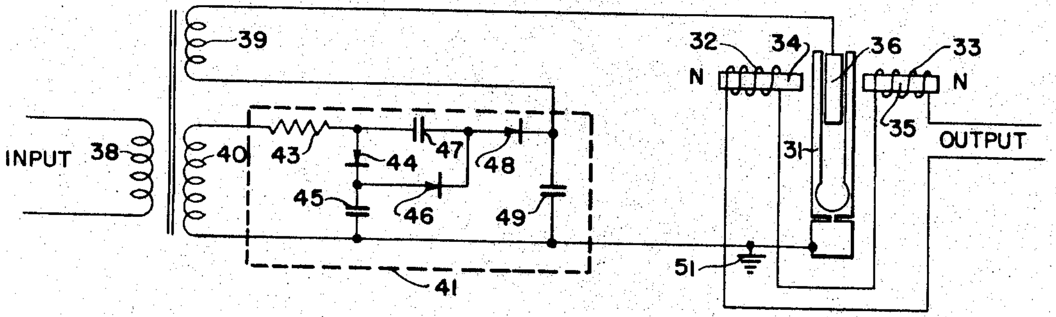
FIGURE 2 is a schematic diagram of a self-biasing electrostatically driven tuning fork resonator according to the present invention.

In FIGURE 2 the input from a preceding transistor stage is supplied to the primary 38 of a transformer 37. Transformer 37 has two secondaries 39 and 40. Each of the secondaries 39 and 40 may have a turns ratio of 25 to 1 with respect to primary 38. It may be assumed that the input signal at primary 38 is approximately 6 volts r.m.s.

Tuning fork 31 has electro-magnetic pickup coils 32 and 33 wound upon magnetized cores 34 and 35 so that the vibrations of tuning fork 31 is converted into an electrical signal available at the output of the pickup circuit. An electrostatic driving electrode 36 is provided between the tines of tuning fork 31.

Electrode 36 is provided with the input signal by connection to transformer secondary 39. An alternating current path for the transformed input signal is provided through a capacitor 49 to the base of the tuning fork 31.

In the circuit of FIGURE 2, the bias voltage for electrode 36 is also obtained from the input signal by means of transformer secondary 40 and the associated bias rectifier circuit 41. The bias rectifier circuit 41 may conveniently be a voltage multiplying circuit since its function is merely to provide a constant bias voltage and a negligible amount of current is required from the circuit. In FIGURE 2, the rectifier circuit 41 is a voltage tripling circuit comprising a damping resistor 43 in series with primary 40 and a serially connected diode rectifier 44 and capacitor 45 connected in parallel with the secondary 40 (and its series resistor 43). On one half cycle of the output of transformer secondary 40, the capacitor 45 will be charged (and will remain substantially fully charged as will later be observed). Diode rectifier 46 and capacitor 47 are in series and connected so that they are in parallel with capacitor 45, transformer secondary 40, and resistor 43. On the second half cycle of the output of transformer secondary 40 capacitor 47 has as a charging source the output of secondary 40 plus the capacitor 45 and thus is charged to substantially twice the voltage output of transformer secondary 40. The operation will be facilitated if the capacitance of capacitor 47 is less than that of capacitor 45.

Diode rectifier 48 and capaictor 49 are serially connected to be in parallel with capacitor 47, transformer secondary 40 and resistor 43. On the third half cycle capactitor 49 has, as a charging source, the output of transformer secondary 40 plus the capacitor 47. Thus capacitor 49 is charged to approximately 3 times the output of transformer secondary 40. Since there is very little direct current drain on capacitor 49 it would remain charged to a substantially constant voltage equal to about three times the peak voltage of the output of secondary 40 in the absence of the voltage of the alternating current signal from transformer secondary 39.

Obviously, the particular rectifier circuit shown in FIGURE 2 may be replaced by other suitable rectifier circuits to provide bias for electrode 36. Rather than a voltage multiplying rectifier a simple half-wave or full-wave rectifier may be utilized and the desired voltage obtained by increasing the number of turns on secondary 40 of transformer 37.

The operation of the apparatus of FIGURE 2 is substantially the same as previously explained for FIGURE 1 in that a sharp filtering action is provided for input signals to transformer 37 whereby all signals except those very near the resonant frequency of tuning fork 31 are strongly attenuated while signals at the resonant frequency are passed with substantially less attenuation. One feature of FIGURE 2 not present in FIGURE 1 should be noted, namely that the bias voltage is automatically adjusted in accordance with the magnitude of the input signal. This will, in many cases be a desirable feature since the amount of bias voltage necessary for proper operation is directly determined by the peak-to-peak voltage of the input signal. The circuit of FIGURE 2 provides adequate bias voltage in every case without creating an unnecessarily large bias voltage in the case of low voltage input signals.

The electrostatic drive mechanism for tuning forks according to the present invention lends itself particularly well to providing a common drive mechanism for a plurality of tuning forks. Such a plurality of tuning forks may have their output circuits connected together in series or parallel so that the characteristic of the entire circuit is the composite of the resonance characteristics of the various tuning forks. Thus, a band pass filter, for example, may be constructed having a characteristic with a broad flat top and sharp cut-off at the upper and lower boundaries of the band pass region. Alternatively, the outputs from the various tuning forks may be utilized separately, for example, for frequency analysis of a complex input signal.

Figure 3:
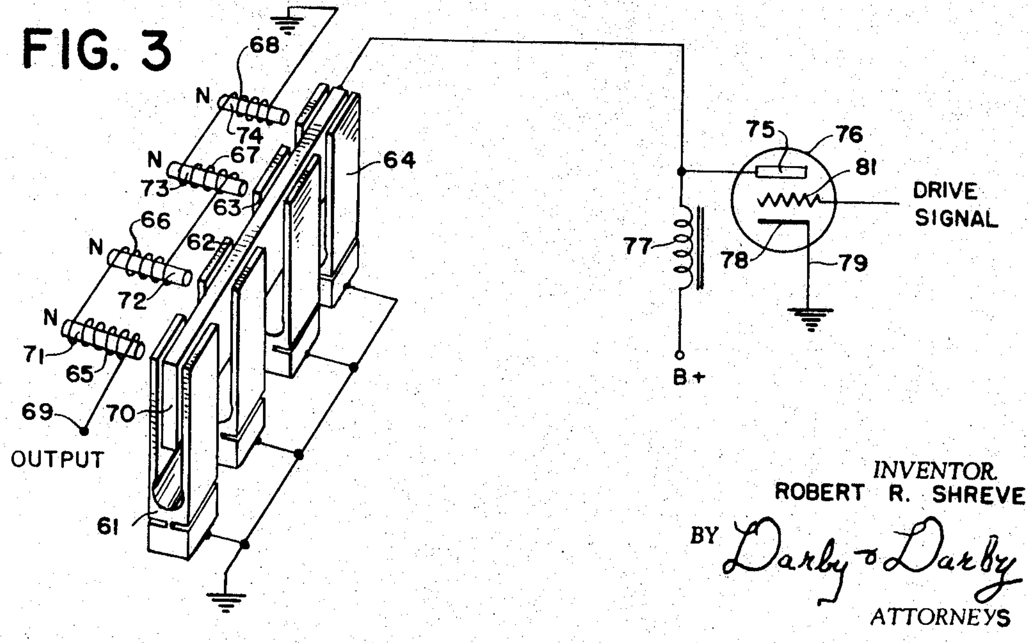
FIGURE 3 is a schematic diagram of a multiple tuning fork resonator having a common electrostatic driving electrode in accordance with the present invention.

A multiple tuning fork with common electrostatic drive is illustrated in FIGURE 3. In FIGURE 3 a set of tuning forks 61, 62, 63 and 64 are mounted with the gaps between their tines in alignment. Each of the forks, 61–64, is provided with a respective pickup coil 65–68. Each of the coils 65–68 is wound on a respective core 71–74 which may be magnetized to provide a magnetic bias.

The coils 65–68 may be connected together in series as indicated in FIGURE 3. Thus, the sum of the signals from the pickup coils 65–68 is available at output terminal 69. A common driving electrode 70 is located between the gaps of tuning forks 61–64. The electrode 70 is driven electrically from an electron tube 76, the plate 75 of which is connected to electrodes 70. Plate 75 of electron tube 76 is connected through inductance 77 to the B+ power supply. Cathode 78 of electron tube 76 is connected through lead 79 to ground to complete the plate-cathode circuit of tube 76. The input signal to the circuit of FIGURE 3 is coupled to control grid 81 of electron tube 76.

The multiple tuning fork arrangement of FIGURE 3 will be useful in various circumstances, for example, as a band pass filter. In such a use, the tuning forks 61–64 will be adjusted to have four overlapping resonance curves. For example, the forks may be designed to have their resonance (frequency vs. amplitude) curves intersect at the half-amplitude values of adjacent forks. Thus a band pass filter passing the band of frequencies of all of forks 61–64 is provided. Such a filter may have a quite sharp cut-off at the edge of the pass band corresponding substantially to the sharp frequency selectivity of a single fork. Obviously, other forms of filters may advantageously use the common drive mechanism illustrated in FIGURE 3. For example, comb filters, narrow-band reject filters, etc. Also the individual pick-up coils 65–68 may be provided with separate outputs so that the apparatus of FIGURE 3 thus modified may be utilized as a frequency analyzer.

The arrangement of FIGURE 3 is quite advantageous in providing a compact multiple tuning fork filter arrangement and also provides considerable saving in that a single driving amplifier is adequate to provide the current and power necessary to drive a number of tuning fork resonators. Ganging of tuning fork resonators, such as illustrated in FIGURE 3, would be impractical in the case of electromagnetic drive mechanisms, due to the fact that each electromagnetic output coil must be substantially magnetically isolated from the driving coil or coils. This would be a practical impossibility if the tuning forks were ganged to be driven by one large driving coil.

With respect to all embodiments of the invention, including those illustrated in FIGURES 1, 2 and 3, the present invention provides another advantage in that the upper limit of tuning fork frequency need not be affected by the change in magnetic characteristics with increasing frequency. In the case of electromagnetically driven tuning forks the efficiency of the drive mechanism falls off rapidly as the fork frequency is increased. Eddy current losses increase as the square of frequency, while hysteresis losses increase directly with frequency. As a result, electromagnetically driven tuning forks are limited as a practical matter to approximately five thousand cycles per second.

On the other hand, in the electrostatically driven tuning fork, the corresponding losses are the dielectric losses of the gap between the electrode and the tuning tine. In the case of a vacuum, or even in the case of air dielectric, the losses are practically nonexistent. The frequency limitation on the fork will therefore be extended to the mechanical limitations of the fork itself. Raising the tuning fork frequency will in some cases have advantages in itself, but it also has the advantage of allowing the tuning fork to be made proportionally smaller. The mass and volume of a tuning fork resonator may thus be reduced by a factor of one thousand.

From the foregoing explanation, it will be appreciated that the use of electrostatic drive for tuning fork resonators and particularly of the form shown and described, provides notable advantages over previously utilized forms of tuning fork resonators. Among the advantages are release from frequency limitations imposed by magnetic properties, avoidance of temperature dependent changes in frequency resulting from temperature dependent changes in magnetic characteristics, and the ability to gang a series of tuning forks to be driven by a single simple driving mechanism.

What is claimed is:

1. An electromechanical frequency selective device comprising a plurality of tuning forks of different frequencies, at least one tine of each said tuning fork having a respective conductive surface area, one common electrode closely spaced with respect to all said surface areas, means for applying an input signal voltage between said electrode and said surface areas to cause said tines to be attracted toward said electrode in accordance with said signal voltage, and individual electromagnetic means for generating an electrical signal in accordance with the respective vibratory movement of each of said tuning forks.

2. An electromechanical frequency selective device comprising a plurality of tuning forks of different frequencies, the tines of each said tuning fork having respective conductive surface areas, one common electrode located between the respective tines of said forks and closely spaced with respect to all said surface areas, means for applying an input signal voltage between said electrode and said surface areas to cause said tines to be attracted toward said electrode in accordance with said signal voltage, means for applying a bias voltage between said electrode and said surfaces greater than the peak to peak voltage of said input signal, and individual electromagnetic means for generating an electrical signal in accordance with the respective vibratory movement of each of said tuning forks, said electromagnetic means each comprising a coil and a core having a magnetic circuit including at least one of said tines.

References Cited

UNITED STATES PATENTS

| | | | |
|---|---|---|---|
| 1,913,331 | 6/1933 | Buckingham | 84—409 |
| 1,928,503 | 9/1933 | Reisz | 179—111 |
| 1,958,071 | 5/1934 | Scofield | 84—409 |
| 2,034,282 | 3/1936 | Buckingham | 84—409 |
| 2,235,317 | 3/1941 | Gibbs | 333—71 |
| 2,302,895 | 11/1942 | Root | 333—71 |

FOREIGN PATENTS

| | | |
|---|---|---|
| 370,248 | 4/1932 | Great Britain. |
| 1,091,147 | 10/1954 | France. |

HERMAN KARL SAALBACH, *Primary Examiner.*

C. BARAFF, *Examiner.*